United States Patent
Krishnan et al.

(10) Patent No.: US 9,682,733 B2
(45) Date of Patent: Jun. 20, 2017

(54) TONNEAU COVER WITH INTEGRATED STORAGE COMPARTMENT

(71) Applicant: FORD GLOBAL TECHNOLOGIES, LLC, Dearborn, MI (US)

(72) Inventors: Venkatesh Krishnan, Wayne, MI (US); Brandon Buckhalt, Belleville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/710,850

(22) Filed: May 13, 2015

(65) Prior Publication Data
US 2016/0332679 A1 Nov. 17, 2016

(51) Int. Cl.
*B60P 7/02* (2006.01)
*B62D 33/04* (2006.01)
*B60P 3/00* (2006.01)
*B60J 7/16* (2006.01)

(52) U.S. Cl.
CPC .......... *B62D 33/042* (2013.01); *B60J 7/1607* (2013.01); *B60P 3/007* (2013.01); *B60P 7/02* (2013.01)

(58) Field of Classification Search
CPC ...... B60P 7/00; B60P 7/02; B60P 7/04; B60P 7/08; B60P 7/1614; B60P 7/1621; B60P 5/0491; B60R 9/00; B60R 9/06; B60R 9/065; B60R 11/00
USPC ............. 296/37.1, 37.6, 37.16, 37.5, 100.01, 296/100.02, 100.06; 224/402–404; 248/95
See application file for complete search history.

(56) References Cited

U.S. PATENT DOCUMENTS

| | | | |
|---|---|---|---|
| 5,148,613 A * | 9/1992 | Cullen | B01D 53/261 206/204 |
| 6,234,559 B1 | 5/2001 | Block et al. | |
| 6,276,735 B1 | 8/2001 | Champion | |
| 6,435,586 B2 | 8/2002 | Getzschman et al. | |
| 6,520,558 B1 | 2/2003 | Katterloher et al. | |
| 6,929,303 B1 | 8/2005 | Sharples | |
| 7,219,941 B1 | 5/2007 | San Paolo et al. | |
| 7,537,264 B2 * | 5/2009 | Maimin | B60J 7/141 296/100.06 |
| 7,708,329 B2 * | 5/2010 | Duller | B60R 9/00 296/37.13 |
| 7,806,453 B2 | 10/2010 | Aebker | |
| 8,210,591 B2 * | 7/2012 | Martin | B60R 9/00 296/100.07 |
| 8,544,708 B2 | 10/2013 | Maimin | |
| 2001/0038225 A1* | 11/2001 | Muirhead | B60J 7/1621 296/100.06 |
| 2003/0085585 A1 | 5/2003 | Dicke | |
| 2004/0050889 A1* | 3/2004 | Shafer, Jr. | B60R 5/045 224/403 |
| 2009/0315358 A1 | 12/2009 | Kolpasky et al. | |
| 2012/0080900 A1* | 4/2012 | Daniel | B60J 7/1621 296/37.6 |

* cited by examiner

*Primary Examiner* — Dennis H Pedder
(74) *Attorney, Agent, or Firm* — Jason Rogers; King & Schickli, PLLC

(57) ABSTRACT

A tonneau cover is provided for a pick-up truck. The tonneau cover includes a cover element of sufficient expanse to span a cargo box of the pick-up truck, a storage compartment depending from an underside of the cover element and an access opening in the cover element in communication with the storage compartment. An access flap in the cover element overlies the access opening and may be displaced between open and closed positions.

17 Claims, 5 Drawing Sheets

TONNEAU COVER WITH INTEGRATED STORAGE COMPARTMENT

TECHNICAL FIELD

This document relates generally to the vehicle equipment field and, more particularly, to a tonneau cover for a pick-up truck that incorporates at least one integrated storage compartment.

BACKGROUND

Most pick-up trucks that are used by nonbusiness customers are equipped with tonneau covers which extend across the cargo box and conceal the interior of the cargo box when closed. Operators that use these vehicles for grocery or other shopping need to store purchased items in the cab of the pick-up truck or in the cargo box.

Storing items in the cargo box may be problematic for a number of reasons. More specifically, shopping bags do not remain in the same place in the cargo box of a moving vehicle. Accordingly breakable and crushable items like eggs, bread, light bulbs as well as bottled drinks, condiments and food items are not safe to transport in the cargo box due to the potential for damage. It should further be appreciated that the cargo box is often dirty or muddy and an operator may not wish to expose the groceries or other items in the shopping bag to this dirty environment.

While storing groceries and shopping bags inside the vehicle may seem to be a simple solution, it is often inconvenient to do so when there are many passengers. Further, while many pick-up trucks incorporate tool boxes which provide a smaller storage space potentially ideal for shopping bags, it should be appreciated that such boxes are expensive, very heavy and often do not provide the desired flexibility since they cannot be moved out of the way if the entire cargo box needs to be used by the operator.

This document relates to a new and improved tonneau cover incorporating an integrated storage compartment that better addresses the need for storage space for shopping bags including the ability to hold and protect breakable and crushable items from damage due to shifting during vehicle operation.

SUMMARY

In accordance with the purposes and benefits described herein, a tonneau cover is provided for a pick-up truck. That tonneau cover comprises a cover of sufficient expanse to span a cargo box of the pick-up truck. Further, the cover includes an integral storage compartment that depends from an underside of the cover. An access opening is provided in the cover in communication with the storage compartment. Further an access flap is provided in the cover overlying the access opening.

In one possible embodiment, the storage compartment includes walls made from a flexible netting material. In one possible embodiment, that flexible netting material is elastic so that it will hug and hold items placed in the storage compartment thereby effectively preventing or limiting shifting during vehicle operation and, accordingly, protecting the items from potential damage that might have otherwise occurred due to shifting of the item in response to forces imparted to the item during vehicle operation.

In one possible embodiment the cover is rigid. Such a cover may be connected to the pick-up truck by a hinge which allows the cover to be opened to access the cargo box. One or more struts may be provided to hold the cover in the open position.

In another possible embodiment, the cover includes a plurality of sections that are connected together by living hinges.

In one particularly useful embodiment, the tonneau cover for a pick-up truck comprises a cover including a first section, a second section, a third section, a first hinge connecting the first section to the second section and a second hinge connecting the second section to the third section. Further the tonneau cover includes a first storage compartment depending from an underside of the first section, a second storage compartment depending from an underside of the second section and a third storage compartment depending from an underside of the third section. A first access opening is provided in the first section in communication with the first storage compartment. A second access opening is provided in the second section in communication with the second storage compartment. In addition, a third access opening is provided in the third section in communication with the third storage compartment.

A first access flap is provided overlying the first access opening. A second access flap is provided overlying the second access opening. A third access flap is provided overlying the third access opening. Each of the flaps may be displaced between a closed position closing the associated access opening and an open position opening the associated access opening to the storage compartment to which it communicates.

In accordance with an additional aspect a pick-up truck is provided. That pick-up truck comprises a cargo box including a first sidewall and a second sidewall. A cover is supported on the first sidewall and the second sidewall so as to span the cargo box. A storage compartment depends from an underside of the cover. An access opening in the cover is provided in communication with the storage compartment. Further, an access flap is provided in the cover overlying the access opening. The access flap is displaceable between an open position and a closed position.

In the following description, there are shown and described several preferred embodiments of the tonneau cover incorporating an integrated storage compartment. As it should be realized, the tonneau cover is capable of other, different embodiments and its several details are capable of modification in various, obvious aspects all without departing from the tonneau cover as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the tonneau cover and together with the description serve to explain certain principles thereof. In the drawing figures.

Reference will now be made in detail to the present preferred embodiments of the tonneau cover, examples of which are illustrated in the accompanying drawing figures.

DETAILED DESCRIPTION

Figure 1:
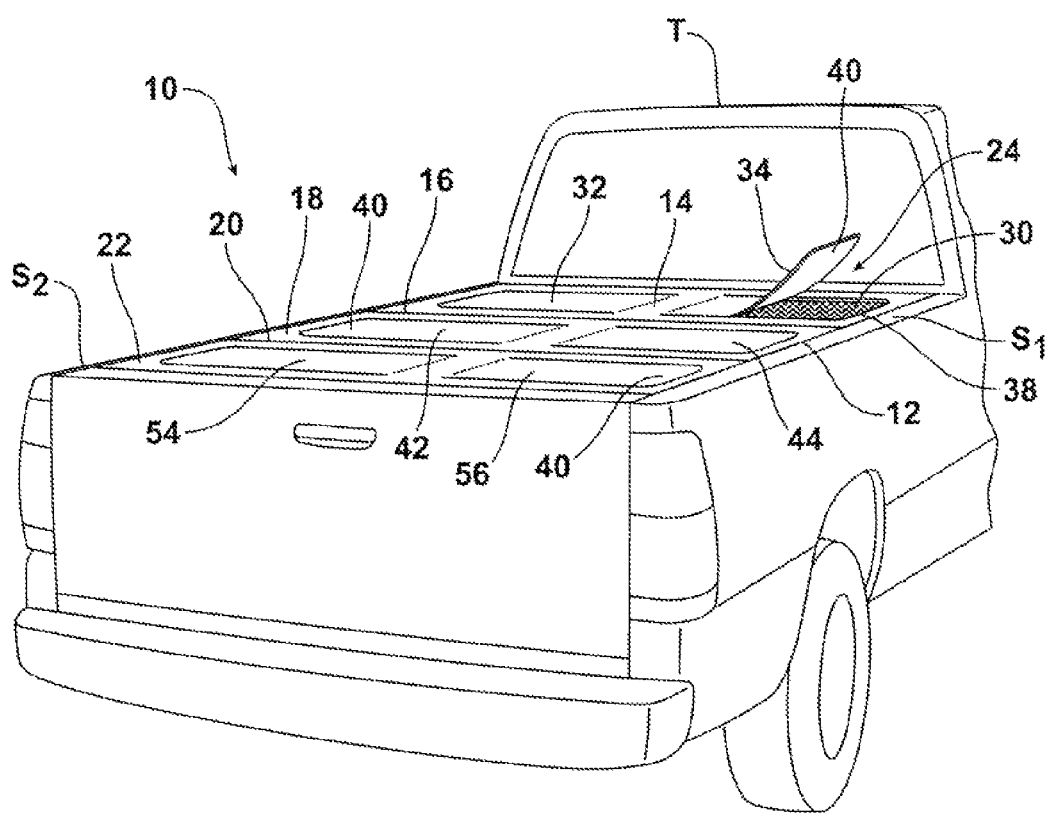
FIG. 1 is a perspective view of a first embodiment of the tonneau cover positioned over the cargo box of a pick-up truck.
Figure 2:
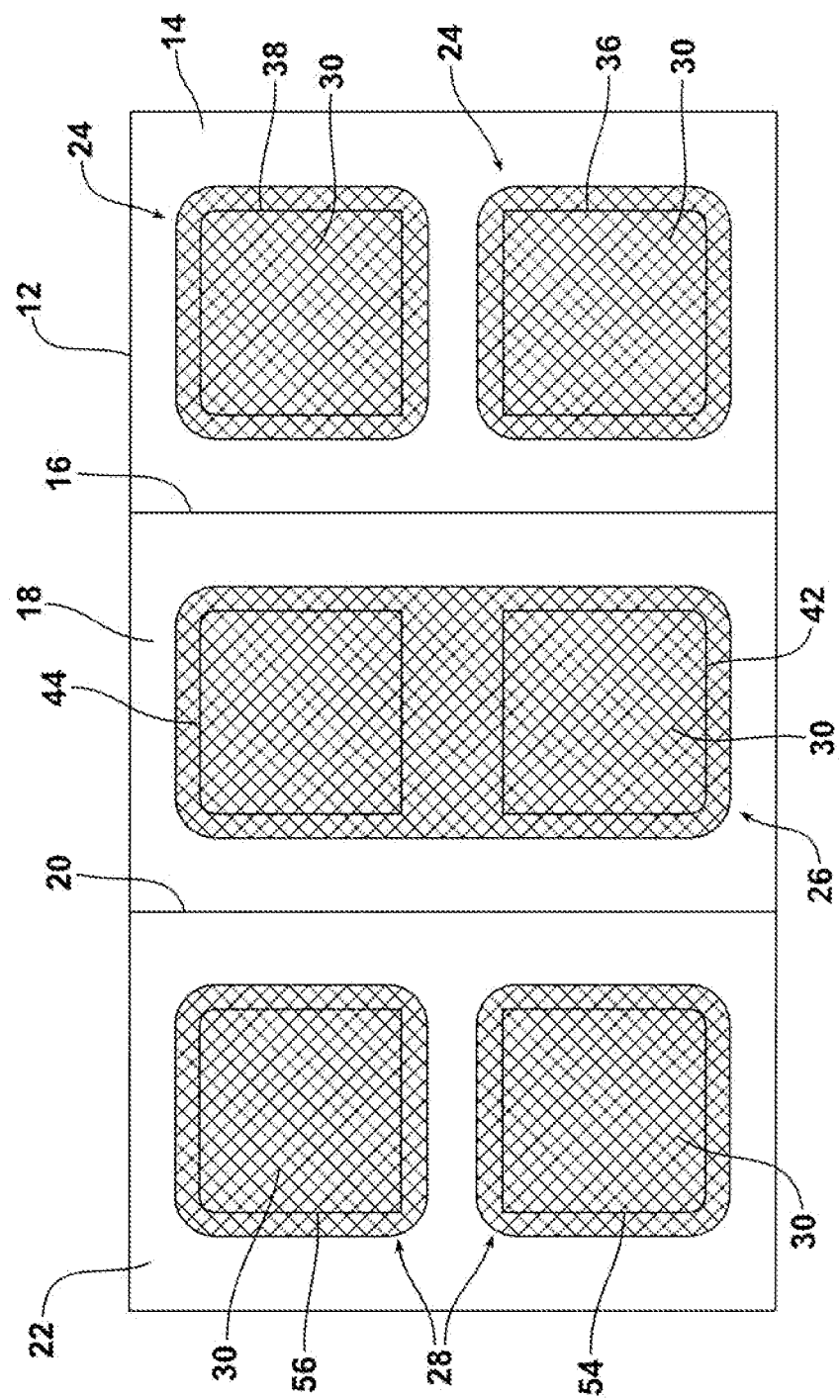
FIG. 2 is a bottom plan view of the tonneau cover illustrated in FIG. 1, showing three storage compartments with one such compartment depending from an underside of each panel of the cover.
Figure 3:
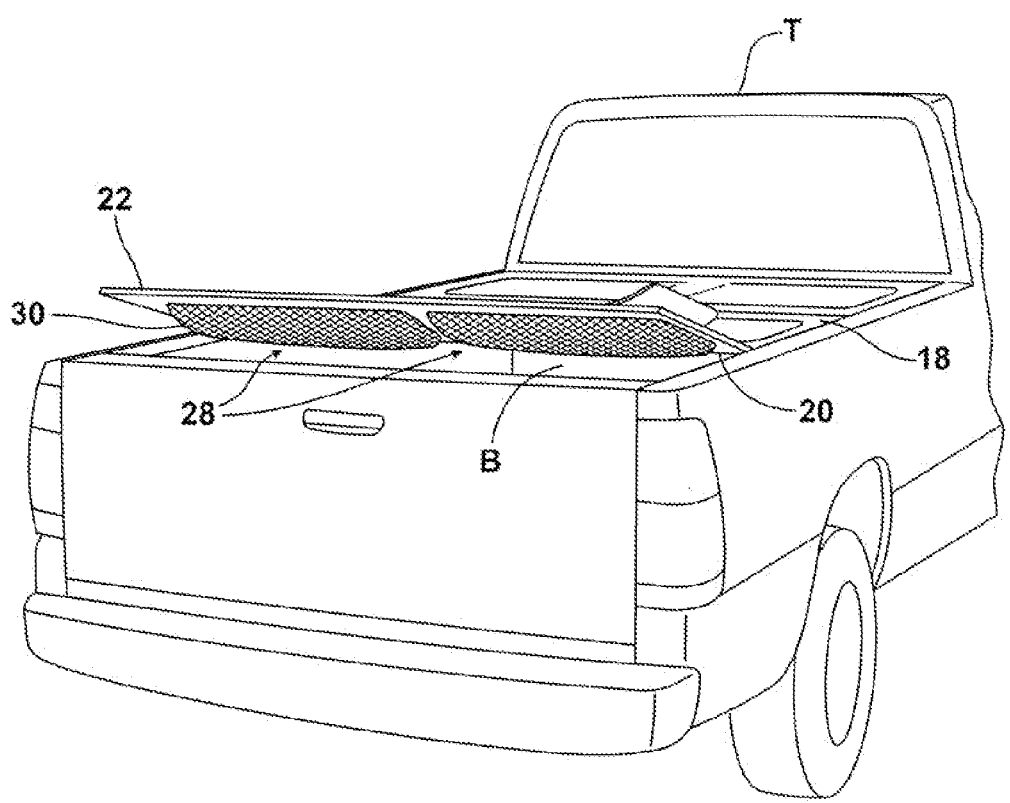
FIG. 3 is a perspective view illustrating how one section of the tonneau cover may be pivoted upwardly via living hinge in order to gain access to the interior of the storage box of the pick-up truck if desired.

Reference is now made to FIGS. 1-3 illustrating a first embodiment of the tonneau cover 10. As illustrated, the tonneau cover 10 includes a cover element 12 of sufficient expanse to span a cargo box B of a pick-up truck T. The cover element 12 is supported at its margins on the first sidewall S1 and second sidewall S2 to the cargo box B. In this embodiment the cover element 12 comprises a first rigid section or panel 14 connected by a living hinge 16 to a second rigid section or panel 18 which is connected by a second living hinge 20 to a third rigid section or panel 22.

As illustrated in FIGS. 1 and 2, a first storage compartment 24 depends from an underside of the first section 14. A second storage compartment 26 depends from an underside of the second section 18. In addition, a third storage compartment 28 extends or depends from an underside of the third section 22.

In the illustrated embodiment, each of the storage compartments 24, 26, 28 includes walls made from a flexible netting material 30. In one possible embodiment that flexible netting material 30 is elastic. Such an elastic netting material 30 provides a positive, "hugging" force for items held in the storage compartment 24, 26 or 28 thereby more effectively preventing them from shifting during operation of the motor vehicle. Thus the items are better protected from potential damage. Further such a flexible netting material 30 springs back and is carried adjacent to the underside of the associated section 14, 18, 22 of the cover element 12 when not employed to store any items thereby keeping the netting tucked up and out of the way of the main area of the underlying cargo box B.

While a flexible netting material 30 does provide the substantial benefits previously described, it should be appreciated that other material may be utilized for the construction of the storage compartments 24, 26, 28.

As further illustrated in FIG. 1, the first section 14 includes two opposed access flaps 32, 34 that allow one to selectively open and close two related access openings 36, 38 provided in the first section 14 in communication with the first storage compartment 24. As illustrated, access flap 32 is closed so as to seal the access opening 36 while access flap 34 is opened so as to allow access to the first storage compartment 24 through the access opening 38. In the illustrated embodiment, fasteners 40 allow one to secure the flaps 32, 34 in a closed position. Such a fastener may take any appropriate construction including, but not limited to, hook and loop fasteners, magnetic fasteners, snap fasteners, zippers and the like.

As further illustrated in FIGS. 1-2, the second section 18 includes two opposed access flaps 42, 44 associated with two access openings 46, 48 in communication with the second storage compartment 26 while the third section 22 includes two access flaps 50, 52 associated with two access openings 54, 56 in communication with the third storage compartment 28. As should be appreciated, the opposed access openings 36, 38/42, 44/54, 56 allow one to easily access the underlying storage compartments 24, 26, 28 from either side of the pick-up truck T. Here, it should be appreciated that the reach over the vehicle sidewall S1 or S2 is ergonomically friendly as the elastic cargo nets 30 forming the storage compartments 24, 26, 28 are immediately under the cover element 12, which is substantially above the floor of the cargo box B.

FIG. 3 illustrates how the living hinge 20, allows one to pivot the section 22 upwardly in order to gain access to the underlying cargo box B if desired. Note how the elastic cargo nets 30 stay close to the underside of the panel or section 22 out of the way. The living hinge 16 allows one to similarly pivot the section 14 upwardly to gain access to the cargo box B at the front end of the cargo box.

Figure 4:
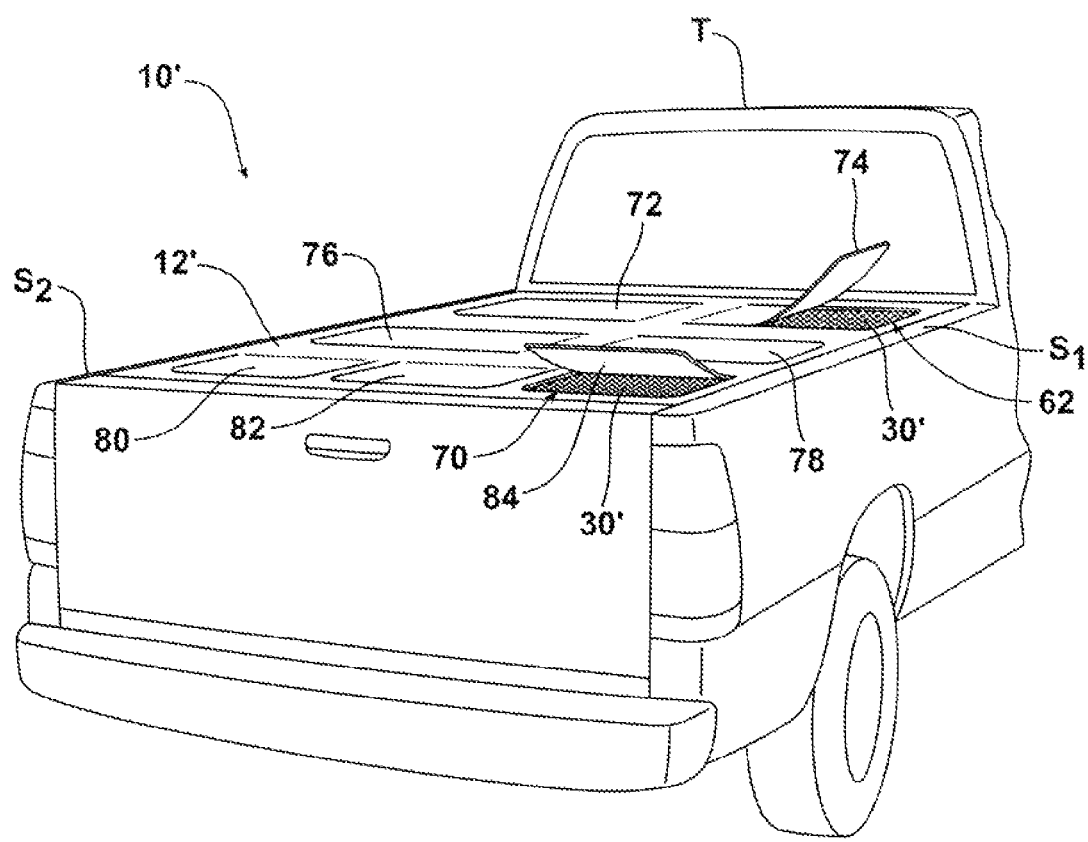
FIG. 4 is a perspective view similar to FIG. 1 but illustrating a second embodiment of the tonneau cover.
Figure 5:
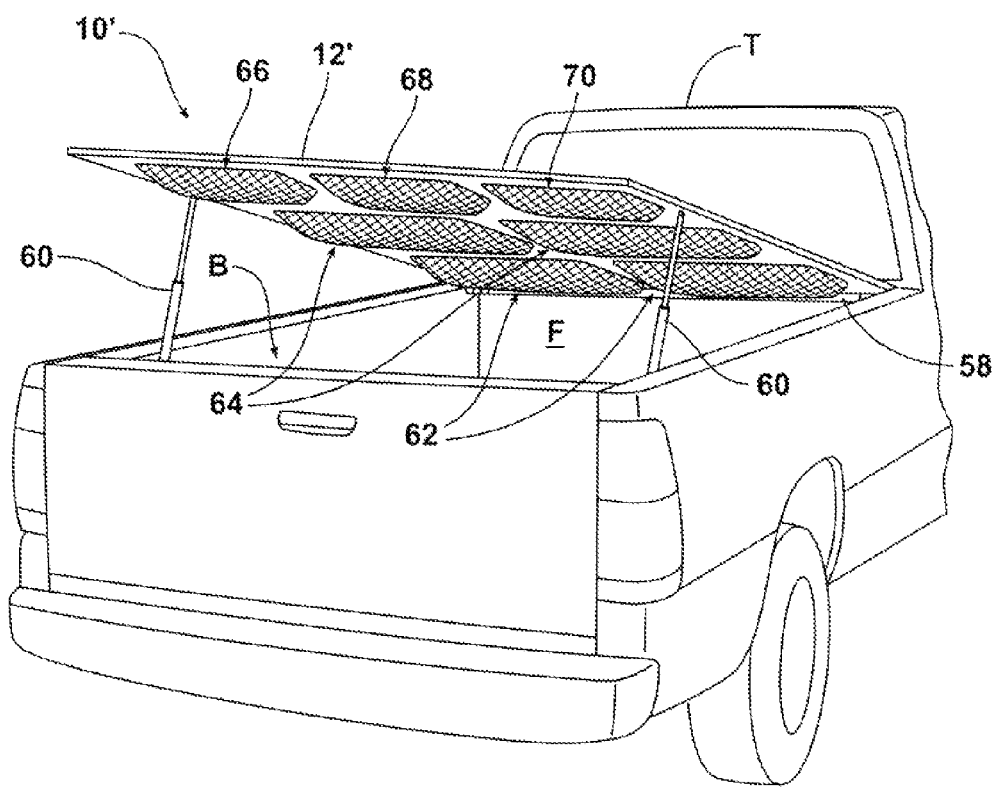
FIG. 5 is a perspective view illustrating the tonneau cover embodiment of FIG. 3 hinged open to allow access to the cargo box of the pick-up truck and illustrate how the storage compartments of the elastic cargo netting are resiliently held adjacent the underside of the tonneau cover when not being used to store any items.

Reference is now made to FIGS. 4 and 5 illustrating yet another embodiment of the tonneau cover 10'. This embodiment of the tonneau cover 10' includes a single piece cover element 12' made from a rigid material. As illustrated, that cover element 12' is supported on and connected by means of hinges 58 to the front wall F of the pick-up truck T so that the cover element 12' may be opened and closed in order to gain access to the cargo box B. Hydraulic or gas struts 60 hold the cover 12' in the open position (see FIG. 5).

Similar to the embodiment of the tonneau cover 10 illustrated in FIGS. 1 and 2, the tonneau cover 10' includes a plurality of storage compartments 62, 64, 66, 68 and 70. As illustrated, storage compartment 62 may be accessed through opposed flaps 72, 74. The cover element 12' includes opposed access flaps 76, 78 allowing access to the second storage compartment 64. Further, individual access flaps 80, 82, 84 allow access, respectively, to the individual third, fourth and fifth storage compartment 66, 68, and 70. As should be appreciated, the opposed flaps 72, 74 and 76, 78 are oriented with the flap opening toward the sidewalls S1, S2 of the cargo box to allow access over the sidewalls. In contrast, the access flaps 80, 82 and 84 open toward the tailgate to allow access to the third, fourth and fifth storage compartments 66, 68, 70 over the tailgate.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A tonneau cover for a pick-up truck, comprising:
a cover element for a cargo box of said pick-up truck, wherein said cargo box has a floor;
an integrated storage compartment having walls made from a flexible netting material, said integrated storage compartment depending from an underside of said cover element such that a space is formed between a bottom of the integrated storage compartment and the floor of the cargo box;
an access opening in said cover element in communication with said storage compartment; and
a flexible access flap in said cover element overlying said access opening.

2. The tonneau cover of claim 1, wherein said flexible netting material is elastic.

3. The tonneau cover of claim 1, wherein said cover element is rigid.

4. The tonneau cover of claim 3, wherein said cover element is connected to said pick-up truck by a hinge and supported in an open position by at least one strut.

5. The tonneau cover of claim 1, wherein said cover element includes a plurality of sections connected together by living hinges.

6. A tonneau cover for a pick-up truck having a cargo box with a floor, comprising:
- a cover element including a first section, a second section, a third section, a first hinge connecting said first section to said second section and a second hinge connecting said second section to said third section;
- a first storage compartment depending from an underside of said first section, wherein a bottom portion of the first storage compartment is spaced from the floor of the cargo box;
- a second storage compartment depending from an underside of said section, wherein a bottom portion of the second storage compartment is spaced from the floor of the cargo box;
- a third storage compartment depending from an underside of said third section, wherein a bottom portion of the third storage compartment is spaced from the floor of the cargo box;
- a first pair of access openings in said first section in communication with said first storage compartment;
- a second pair of access openings in said second section in communication with said second storage compartment;
- a third pair of access openings in said third section in communication with said third storage compartment;
- a first pair of flexible access flaps overlying said first pair of access openings;
- a second pair of flexible access flaps overlying said second pair of access openings; and
- a third pair of flexible access flaps overlying said third pair of access openings.

7. The tonneau cover of claim 6 wherein said first storage compartment includes walls made from a flexible netting material.

8. The tonneau cover of claim 7, wherein said flexible netting material is elastic.

9. A pick-up truck, comprising:
- a cargo box including a first sidewall and a second sidewall;
- a tonneau cover supported on said first sidewall and said second sidewall so as to span said cargo box;
- an integrated storage compartment depending from an underside of said tonneau cover, wherein said storage compartment includes walls made from a flexible netting material, and wherein the flexible netting material is immediately under the tonneau cover above a floor of the cargo box;
- an access opening in said tonneau cover in communication with said storage compartment; and
- a flexible access flap in said tonneau cover overlying said access opening.

10. The pick-up truck of claim 9 wherein said flexible netting material is elastic.

11. The pick-up truck of claim 10 wherein said tonneau cover is rigid.

12. The pick-up truck of claim 11, wherein said tonneau cover is connected to said cargo box by a hinge and supported in an open position by at least one strut.

13. The pick-up truck of claim 10, wherein said tonneau cover includes a plurality of sections connected together by living hinges.

14. The pick-up truck of claim 13, wherein said plurality of sections include a plurality of storage compartments having a plurality of access openings.

15. The pick-up truck of claim 14, further including a plurality of flaps overlying said plurality of access openings.

16. The pick-up truck of claim 15, wherein at least two flaps of said plurality of flaps are opposing so as to open toward two opposing sidewalls of said cargo bed.

17. The pick-up truck of claim 16 wherein at least one flap of said plurality of flaps opens rearwardly toward a tailgate of said pick-up truck.

* * * * *